(12) United States Patent
Paulot et al.

(10) Patent No.: US 6,767,670 B2
(45) Date of Patent: Jul. 27, 2004

(54) CARBON-COATED TITANIUM CURRENT COLLECTORS FOR USE IN ALKALI METAL ELECTROCHEMICAL CELLS

(75) Inventors: William M. Paulot, Lancaster, NY (US); Mark J. Roy, Buffalo, NY (US); Gary L. Freitag, East Aurora, NY (US); Dominick J. Frustaci, Williamsville, NY (US); Hong Gan, East Amherst, NY (US); Esther S. Takeuchi, East Amherst, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 0 days.

(21) Appl. No.: 10/294,260

(22) Filed: Nov. 14, 2002

(65) Prior Publication Data
US 2003/0118909 A1 Jun. 26, 2003

Related U.S. Application Data

(60) Provisional application No. 60/332,195, filed on Nov. 14, 2001, and provisional application No. 60/417,248, filed on Oct. 9, 2002.

(51) Int. Cl.[7] .............................. H01M 4/66; H01M 4/70
(52) U.S. Cl. ............... 429/245; 429/231.2; 429/231.95; 429/233; 429/122; 429/231.7
(58) Field of Search ............................. 429/245, 231.7, 429/231.2, 231.95, 122, 233

(56) References Cited

U.S. PATENT DOCUMENTS

| | | | |
|---|---|---|---|
| 4,212,933 A | * | 7/1980 | Markin ........................ 429/122 |
| 4,925,752 A | | 5/1990 | Fauteux et al. |
| 5,011,501 A | | 4/1991 | Shackle et al. |
| 5,041,199 A | | 8/1991 | DiFranco |
| 5,326,653 A | | 7/1994 | Chang |
| 5,443,928 A | | 8/1995 | Takeuchi et al. |
| 5,518,839 A | * | 5/1996 | Olsen ......................... 429/192 |
| 5,716,728 A | * | 2/1998 | Smesko et al. ............... 429/60 |
| 5,824,120 A | * | 10/1998 | Mitchell ..................... 29/623.1 |
| 5,955,218 A | | 9/1999 | Crespi et al. |
| 6,106,978 A | | 8/2000 | Takeuchi |
| 6,130,005 A | | 10/2000 | Crespi et al. |
| 6,150,057 A | | 11/2000 | Takeuchi |
| 6,261,722 B1 | * | 7/2001 | Dasgupta ..................... 429/304 |
| 6,296,961 B1 | | 10/2001 | Moy et al. |
| 6,368,738 B1 | | 4/2002 | Passaniti et al. |
| 6,414,837 B1 | | 7/2002 | Sato et al. |
| 6,436,571 B1 | | 8/2002 | Passaniti et al. |
| 6,451,483 B1 | | 9/2002 | Probst et al. |
| 2001/0001055 A1 | | 5/2001 | Takeuchi |
| 2002/0015890 A1 | | 2/2002 | Nakura |
| 2002/0025476 A1 | | 2/2002 | Takeuchi |

FOREIGN PATENT DOCUMENTS

| | | | | |
|---|---|---|---|---|
| EP | 1014460 | * | 6/2000 | ............ H01M/4/04 |
| EP | 1122804 | * | 8/2001 | ............ H01M/4/66 |
| JP | 53032332 | * | 3/1978 | ............ H01M/4/66 |
| JP | 80030666 | * | 8/1980 | ............ H01M/4/66 |

* cited by examiner

*Primary Examiner*—Mark Ruthkosky
(74) *Attorney, Agent, or Firm*—Michael F. Scalise

(57) ABSTRACT

An alkali metal/solid cathode electrochemical cell, such as of a Li/SVO couple, having the cathode material supported on a titanium current collector screen coated with a carbonaceous material is described. The thusly-coated titanium current collector provides the cell with higher rate capability in comparison to cells of a similar chemistry having the cathode active material contacted to an uncoated titanium current collector.

19 Claims, 1 Drawing Sheet

CARBON-COATED TITANIUM CURRENT COLLECTORS FOR USE IN ALKALI METAL ELECTROCHEMICAL CELLS

CROSS REFERENCE TO RELATED APPLICATION

This application claims priority based on U.S. provisional application Serial Nos. 60/332,195, filed Nov. 14, 2001 and 60/417,248, filed Oct. 9, 2002.

BACKGROUND OF THE INVENTION

1. Field of the Invention

The present invention generally relates to the conversion of chemical energy to electrical energy and, more particularly, to an alkali metal electrochemical cell having a cathode current collector provided with a conductive coating to increase the electrode's conductivity. A preferred cathode includes a solid active material and a most preferred cathode active material is a metal oxide, such as silver vanadium oxide (SVO).

2. Prior Art

It is known to coat a cathode current collector screen before contacting the active material thereto. Carbonaceous materials are suitable for this purpose. For example, U.S. Pat. No. 6,451,483 to Probst et al., which is assigned to the assignee of the present invention and incorporated herein by reference, describes a prior art Li/CF$_x$ cell including a titanium cathode current collector screen coated with a thin layer of graphite/carbon paint. In addition to increasing the electrical conductivity between the CF$_x$ and the current collector, the graphite/carbon paint serves to prevent direct contact at their interface. A major problem with CF$_x$ active materials supported on titanium current collectors is that the fluorine reacts with titanium to form titanium fluoride. This by-product is corrosive and degrades cell discharge performance through current collector pitting.

For example, U.S. Pat. No. 6,261,722 to Dasgupta et al. disclose a lithium battery comprising a cathode current collector provided with a mixture of carbon fibres and fine carbon particles. The problem is that these coating materials are added to a fluorinated polymer and possibly a low boiling point solvent such as toluene, acetone, or n-methyl pyrrolidinine (NMP). The coating is brushed or dipped onto the current collector and then evaporated off before being contacted by the cathode active material. Dasgupta et al. list a host of suitable current collector materials including titanium. However, according o the present invention, the presence of fluorine ions in contact with the titanium current collector detracts from cell performance, especially as the cell approaches end-of-life (EOL).

SUMMARY OF THE INVENTION

Accordingly, the present invention is directed to coating a titanium substrate with a carbonaceous material. When the substrate is used as a current collector, this increases the electrical conductivity at the active material/substrate interface. Preferably, the carbonaceous material in an alcohol-based suspension is contacted to the substrate followed by a heating step to affect the bonding process. The thusly-processed substrates are useful as a cathode current collector in a lithium/solid cathode active material cell. Preferred cell chemistry is of a Li/SVO couple.

These and other objects of the present invention will become increasingly more apparent to those skilled in the art by reference to the following description and to the appended drawings.

DETAILED DESCRIPTION OF THE PREFERRED EMBODIMENTS

Figure 1:
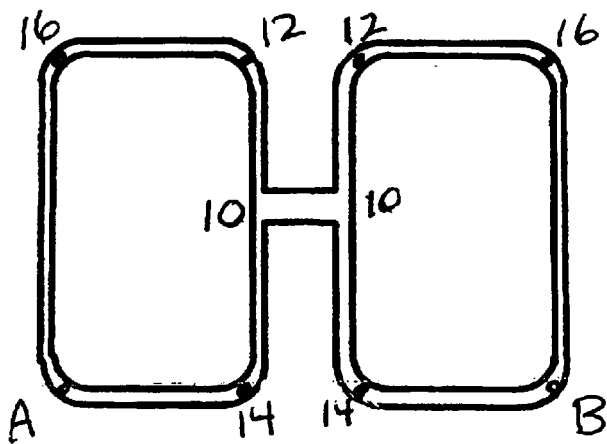
FIG. 1 is a plan view of a current collector design used to test nodal conductivity.

As used herein, the term "pulse" means a short burst of electrical current of significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10-second pulses of about 0.5 mA/cm$^2$ to about 50 mA/cm$^2$ with a 15 second rest between each pulse.

The electrochemical cell of the present invention comprises an anode of a metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably it is a thin metal sheet or foil of the anode metal pressed or rolled on a metallic anode current collector, i.e., preferably comprising titanium, titanium alloy or nickel, to form an anode component. The anode current collector has an integral tab or lead contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell further comprises a cathode of an electrically conductive solid active material and the electrochemical reaction at the cathode involves conversion of ions that migrate from the anode to the cathode into atomic or molecular forms. The cathode may comprise a metal element, a metal oxide, a mixed metal oxide and a metal sulfide, and combinations thereof.

The cathode active material is formed by the chemical addition, reaction, or otherwise intimate contact of various metal oxides, metal sulfides and/or metal elements, preferably during thermal treatment, sol-gel formation, physical vapor deposition, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds.

One preferred metal oxide has the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combination of phases thereof. For a more detailed description of such cathode active materials reference is made to U.S. Pat. No. 4,310,609 to Liang et al. This patent is assigned to the assignee of the present invention and incorporated herein by reference.

Another preferred metal oxide cathode material includes $V_2O_z$ wherein $z \leq 5$ combined with $Ag_2O$ with silver in either the silver (II), silver (I) or silver (0) oxidation state and CuO with copper in either the copper (II), copper (I) or copper (0) oxidation state. This mixed metal oxide has the general formula $Cu_xAg_yV_2O_z$ (CSVO) and the range of material compositions is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

Additional solid active materials which are useful in an electrochemical cell according to the invention include manganese dioxide, lithium cobalt oxide, lithium nickel oxide, copper oxide, titanium disulfide, copper sulfide, iron sulfide, iron disulfide, copper vanadium oxide, fluorinated carbon, and mixtures thereof.

Before fabrication into a cathode for incorporation into an electrochemical cell, the cathode active material is preferably mixed with a binder material such as a powdered fluoro-polymer. More preferably, powdered polytetrafluoroethylene or powdered polyvinylidene fluoride are present in the cathode mixture at, by weight, about 1% to about 5%.

Further, up to about 10%, by weight, of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes, by weight, a powdered fluoro-polymer binder present at about 3%, a conductive diluent present at about 3% and about 94% of the cathode active material.

The cathode active mixture is pressed onto a suitable current collector selected from the group consisting of titanium, tantalum, platinum stainless steel, and gold. The preferred current collector material is titanium, and most preferably the titanium cathode current collector has a thin layer of a carbonaceous material applied thereto. The coating is provided in a range of about of about 0.0001 inches to about 0.0010 inches, and more preferably in a range of about 0.0004 to 0.0005 inches (10 microns to about 12.7 microns). By comparison, the carbonaceous coating of the previously discussed U.S. Pat. No. 6,261,722 to Dasgupta et al. is about 40 microns to about 50 microns thick. In addition to the problem regarding the fluorine polymer carrier of the prior art coating corroding the titanium current collector, the reduced thickness of the present coating provided for more active materials to be housed in a casing of a similar size.

According to the present invention, a finely divided graphite pigment in an alcohol-based epoxy resin solution is used as the coating material. One of dipping, painting, doctor-blading, pressurized air atomization spraying, aerosolized spraying, or sol-gel deposition is used to contact the carbonaceous material to the current collector substrate. Spraying is a preferred method.

A particularly preferred material is commercially available from Acheson Industries, Inc., Port Huron, Mich. under the designation ELECTRODAG 213®. This material is a colloidal suspension of graphite, propylene glycol methyl ether acetate, toluene, formaldehyde, xylene, 2-butoxyethanol and proprietary epoxy and thermoset resins. The thusly-coated substrate is then sintered at a temperature of about 230° C. to about 350° C. for about 30 minutes to 1.5 hours. More preferably, the carbonaceous coating is applied to a thickness of about 0.0004 inches and sintered at about 300° C. for at least about one hour.

Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from polypropylene and fluoropolymeric fibers including polyvinylidene fluoride, polyethylenetetrafluorethylene, and polyethylenechlorotrifluoroethylene used either alone or laminated with a fluoropolymeric microporous film, non-woven glass, polypropylene, polyethylene, glass fiber materials, ceramics, a polytetrafluoroethylene (PTFE) membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). A preferred separator comprises two layers of a microporous polypropylene film.

The electrochemical cell of the present invention further includes a non-aqueous, ionically conductive electrolyte that serves as a medium for migration of ions between the anode and the cathode electrodes during the electrochemical reactions of the cell. Suitable non-aqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a non-aqueous solvent. More preferably, the electrolyte includes an ionizable lithium salt dissolved in a mixture of aprotic organic solvents comprising a low viscosity solvent and a high permittivity solvent. The inorganic, ionically conductive salt serves as the vehicle for migration of the anode ions to intercalate or react with the cathode active material and is selected from $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof. Suitable salt concentrations typically range between about 0.8 to 1.5 molar.

Low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte for SVO is 1.0 M to 1.4 M $LiAsF_6$ or $LiPF_6$ in a 50:50, by volume, mixture of PC and DME.

The preferred form of the electrochemical cell is a case-negative design wherein the anode/cathode couple is inserted into a conductive metal casing with the casing connected to the anode current collector. A preferred material for the casing is stainless steel although titanium, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

Preferred embodiments of the present invention have the following cell designs: lithium/electrolyte/cathode/electrolyte/lithium or lithium/electrolyte/lithium, with the cathode having the following configurations:

SVO/current collector/CFx/current collector/SVO or

SVO/current collector/CFx

In both cathode configurations, the relatively high rate active material, i.e., the SVO/faces the lithium anode and the relatively high capacity material, i.e., CFx, does not. For a more detailed discussion of the preferred cell embodiments, reference is made to U.S. application Ser. No. 09/560,060, which is assigned to the assignee of the present invention and incorporated herein by reference.

The following examples describe the manner and process of manufacturing an electrochemical cell according to the present invention, and they set forth the best mode contemplated by the inventors of carrying out the invention, but they are not to be construed as limiting.

EXAMPLE I

Titanium screens (0.002") thick were spray coated with a graphic material according to the present invention. The current collector had an open area of about 50% provided by uniformly spaced openings. As a comparison, uncoated titanium screens of similar dimensions were used as of a conventional design. The respective current collectors were subjected to voltage drop measurements as indicated in FIG. 1. To illustrate, each of the current collectors were sourced at points A and B and multiple voltage readings were taken across nodes 10 to 16, as shown. The comparative voltage readings are a function of the current between any two-node pairs. There was no coating between nodes 10-10 in either current collector.

TABLE 1

| Average of Voltage Readings Taken | | | | |
|---|---|---|---|---|
| | 10-10 | 12-12 | 14-14 | 16-16 |
| Carbon Coated | 0.144 | 0.313 | 0.508 | 0.618 |
| Uncoated | 0.146 | 0.311 | 0.500 | 0.601 |
| % Difference | −1.4 | 0.6 | 1.6 | 2.8 |

The results shown in Table 1 indicate only a slight difference in resistance between the current invention current collector and that of the prior art. The differences are not deemed statistically significant.

EXAMPLE II

The respective screens were subsequently used as the cathode current collectors in prismatic Li/SVO test cells. The cells were built using five-plate cathodes of about 1.16 grams per plate composed of, by weight, about 94% SVO, about 3% PTFE binder, about 2% graphite, and about 1% carbon black. Lithium metal pressed to a nickel current collector served as the anode. The electrolyte was 1 M $LiAsF_6$ in a 50:50, by volume, mixture of PC:DME.

Each cell was predischarged at 37° C. using a 3.57-kohm load for about 15 hours. Following a one-week open circuit storage period at 37° C., the cells were subjected to a pulse train consisting of four 2.82 amp (31.33 $mA/cm^2$) pulses. Each pulse was applied for 10 seconds with a 15 second rest between the pulses.

An energy increase of about 2% to a 1.5 V cutoff is realized in a 6.4 cc size Li/SVO cell having the cathode current collector provided with a carbonaceous coating according to the present invention in comparison to a similarly sized and constructed cell having an uncoated cathode current collector. In both cells, the cathode current collector had an open area of about 50% and they were discharged under a similar regime.

Figure 2:
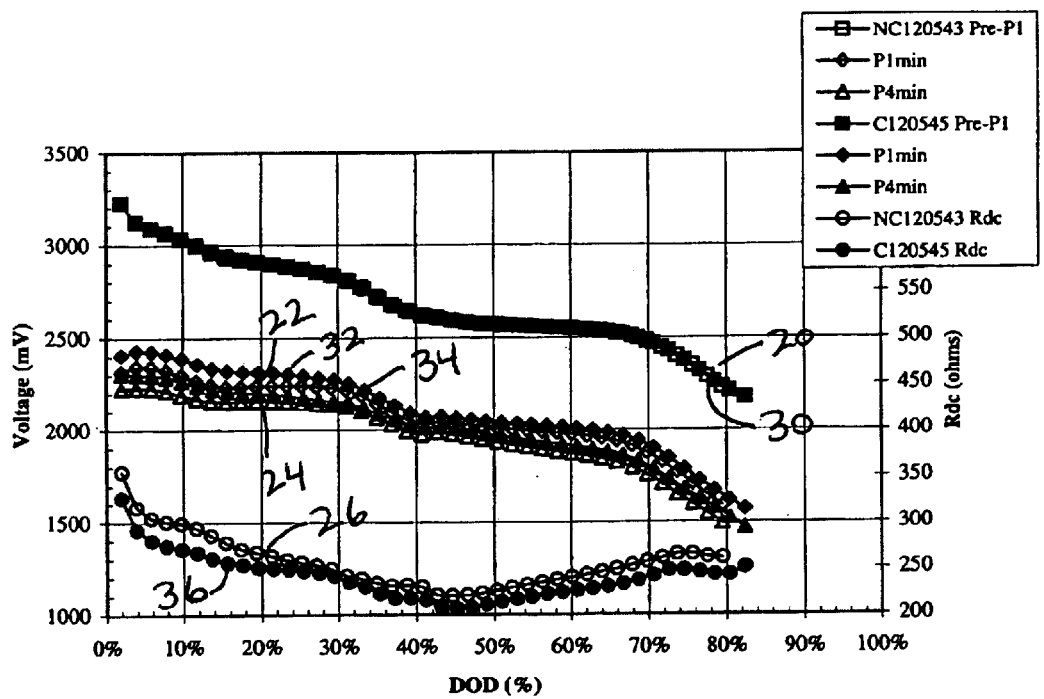
FIG. 2 is a graph constructed from the pulse discharge of a present invention Li/SVO cell having the titanium cathode current collector provided with a carbonaceous coating in comparison to a conventional Li/SVO cell provided with an uncoated cathode current collector.

In FIG. 2, curve 20 was constructed from the prepulse discharge of the prior art cell. In this graph, curve 22 is of the pulse 1 minima voltage of the prior art cell, curve 24 is of the pulse 4 minima and curve 26 is of the Rdc voltage. In comparison, curve 30 was constructed from the prepulse discharge of the present invention cell, curve 32 is of the pulse 1 minima voltage, curve 34 is of the pulse 4 minima and curve 36 is of the Rdc voltage.

Effectively, the energy density and power capability of a Li/SVO cell is substantially improved over that of the prior art. The decreased resistance affected by the carbonaceous coating increases the loaded voltages and decreases Rdc throughout the discharge regime as compared to a conventionally constructed Li/SVO cell not having the cathode current collector provided with a carbon coating. The average increase in capacity afforded by the present invention is about 46 mV for a P4 min voltage at a current density of 31.33-$mA/cm^2$. More significantly, at beginning-of-life (BOL) the increased capacity afforded by the present invention is about 92 mV for a P1min voltage and about 80 mV for a P4 min voltage at a current density of about 31.33-/$cm^2$.

Additionally, the reduced thickness of the carbonaceous coating in comparison to a carbon coating deposited using a fluorinated polymer, as in the previously discussed U.S. Pat.

No. 6,261,722 to Dasgupta et al., means that the cell has relatively more volumetric efficiency.

EXAMPLE III

Twelve lithium anode cells were constructed with the cathode having the structure: SVO/current collector/$CF_x$, with only SVO facing the anode. Six cells (Group 1) were constructed with carbon coated titanium cathode current collectors according to the present invention, while the others (Group 2) were constructed with the titanium current collector devoid of a carbonaceous coating. Both cell groups were activated with an electrolyte of 1M $LiAsF_6$+0.05M dibenzyl carbonate/PC:DME=1:1. Therefore, other than the cathode current collectors, all other cell construction parameters were exactly the same for both cell groups. The theoretical capacity of the cell was about 2.65 AH.

Both cell groups were then discharged at 37° C. by applying one pulse train consisting of four 10 second pulses (current density of about 22.2 $mA/cm^2$) with 15 seconds open circuit rest between the pulses. This is referred to as an acceptance pulse train. The average discharge data of the two cell groups is summarized in Table 2.

TABLE 2

| Group | Carbon Coating | Ppre1 | V-Delay | P1min | P4min |
|-------|---------------|-------|---------|-------|-------|
| 1 | yes | 3.250 | 0.037 | 2.515 | 2.520 |
| 2 | no | 3.255 | 0.053 | 2.447 | 2.483 |

The data in Table 2 demonstrate that the Group 1 cell having carbon coated cathode current collectors presented higher pulse minimum potentials than that of the group 2 cells. Again, th epresent of the carbon coating on th ecurrent collector helps to minimize cell internal resistance.

EXAMPLE IV

After the discharge test described in Example III, two cells from each of groups 1 and 2 were discharged at 37° C. by applying pulse trains every 30 minutes until the pulse 4 minima dropped below 1.5 volts. The average data of discharge efficiency (including the efficiency delivered in Example III) is summarized in Table 3.

TABLE 3

| | | % Theoretical Cathode Capacity | | |
|---|---|---|---|---|
| Group | Carbon Coating | 2.0 V | 1.7 V | 1.5 V |
| 1 | yes | 77.3 | 84.8 | 87.8 |
| 2 | no | 77.7 | 84.9 | 87.6 |

As shown in Table 3, when the freshly made cells were discharged, the cathode current collector coating plays a negligible role in cell discharge efficiency. Both groups of cells delivered about the same amount of capacity to all three pulse minimum voltage cut offs.

It is appreciated that various modifications to the inventive concepts described herein may be apparent to those skilled in the art without departing from the spirit and the scope of the present invention defined by the hereinafter appended claims.

What is claimed is:

1. An electrochemical cell, which comprises:
   a) an anode comprising lithium;
   b) a cathode comprising silver vanadium oxide and $CF_x$ supported on opposed first and second major faces of a conductive current collector comprising titanium, wherein at least the major face supporting the $CF_x$ is provided with a continuous coating of a graphite material substantially devoid of a halide that prevents the $CF_x$ from directly contacting the current collector; and
   c) an electrolyte activating the anode and the cathode.

2. The electrochemical cell of claim 1 wherein the graphite material coating has a thickness of about 0.0001 inches to about 0.0010 inches.

3. The electrochemical cell of claim 1 wherein the graphite material coating is characterized as having been deposited on the current collector by at least one of the group consisting of dipping, painting, doctor-blading, pressurized air atomization spraying, aerosolized spraying, sol-gel deposition, and combinations thereof.

4. An electrochemical cell, which comprises:
   a) an anode comprising lithium;
   b) a first conductive current collector having opposed first and second major faces, at least one of which is provided with a continuous coating of a graphite material substantially devoid of a halide;
   c) a cathode comprising the configuration: silver vanadium oxide/first current collector/$CF_x$, wherein the $CF_x$ is supported on the at least one major face of the first current collector provided with the continuous coating of the graphite material preventing the $CF_x$ from directly contacting the first current collector; and
   d) an electrolyte activating the anode and the cathode housed inside a casing.

5. The electrochemical cell of claim 4 wherein the graphite material coating has a thickness of about 0.0001 inches to about 0.0010 inches.

6. The electrochemical cell of claim 4 wherein the graphite material comprises a finely divided graphite.

7. The electrochemical cell of claim 4 wherein the cathode has the configuration: silver vanadium oxide/first current collector/$CF_x$/second current collector/silver vanadium oxide.

8. The electrochemical cell of claim 7 wherein the first and second current collectors are selected from the group consisting of titanium, tantalum, platinum, stainless steel, and gold.

9. The electrochemical cell of claim 4 wherein the cathode has the configuration: silver vanadium oxide/first current collector/$CF_x$, with the silver vanadium oxide facing the anode.

10. The electrochemical cell of claim 4 wherein the electrolyte is of a nonaqueous chemistry.

11. A method for providing an electrochemical cell, comprising the steps of:
   a) providing a casing;
   b) providing an anode comprising lithium;
   c) providing fluorinated carbon ($CF_x$) and silver vanadium oxide;
   d) providing a current collector having opposed first and second major faces, and contacting at least one of them with a continuous coating of a graphite material substantially devoid of a halide;
   e) supporting the $CF_x$ and silver vanadium oxide on the opposed major faces of the current collector, wherein at least the one major face supporting the $CF_x$ has the continuous carbonaceous coating preventing the fluorinated carbon from directly contacting the current collector;

f) operatively associating the anode with the cathode housed inside the casing; and g) activating the anode and the cathode with an electrolyte filled into the casing.

12. The method of claim 11 including providing the graphite material coating as a colloidal suspension comprising graphite, propylene glycol methyl ether acetate, toluene, formaldehyde, xylene and 2-butoxyethanol.

13. The method of claim 11 including sintering the coated current collector at a temperature of from about 230° C. to about 350° C. for about 30 minutes to about 1.5 hours prior to the current collector supporting the $CF_x$ and silver vanadium oxide thereon.

14. The method of claim 11 including providing the graphite material coating having a thickness of about 0.0001 inches to about 0.0010 inches.

15. The method of claim 11 including contacting the graphite material to the current collector by at least one of the group consisting of dipping, painting, doctor-blading, pressurized air atomization spraying, aerosolized spraying, sol-gel deposition, and combinations thereof.

16. The method of claim 11 including providing the graphite material as a finely divided graphite.

17. The method of claim 11 including providing the cathode having the configuration: silver vanadium oxide/ current collector/$CF_x$/current collector/silver vanadium oxide.

18. The method of claim 11 including providing the cathode having the configuration: silver vanadium oxide/ current collector/$CF_x$ with the silver vanadium oxide facing the anode.

19. An electrochemical cell, which comprises:

a) an anode comprising lithium;

b) a conductive current collector having opposed and second major faces, at least the first major face being is provided with a continuous coating of a graphite material substantially devoid of a halide;

c) a cathode comprising $CF_x$ as a first cathode active material and a second cathode active material other than $CF_x$ wherein the $CF_x$ is supported on the first major face of the current collector provided with the continuous coating of the graphite material preventing the $CF_x$ from directly contacting the current collector, and wherein the second cathode active material supported on the second major face of the current collector is selected from the group consisting of silver vanadium oxide, copper-silver-vanadium oxide, manganese dioxide, lithium cobalt oxide, lithium nickel oxide, copper oxide, titanium disulfide, copper sulfide, iron sulfide, iron disulfide, copper vanadium oxide, and mixtures thereof; and d) an electrolyte activating the anode and the cathode housed inside a casing.

* * * * *

UNITED STATES PATENT AND TRADEMARK OFFICE
CERTIFICATE OF CORRECTION

PATENT NO. : 6,767,670 B2
DATED : July 27, 2004
INVENTOR(S) : William M. Paulot et al.

It is certified that error appears in the above-identified patent and that said Letters Patent is hereby corrected as shown below:

<u>Column 10,</u>
Line 7, after "opposed" insert -- first --; and
Line 8, after "being" delete "is".

Signed and Sealed this

Seventh Day of December, 2004

JON W. DUDAS
*Director of the United States Patent and Trademark Office*